US010205187B2

(12) United States Patent
Keates et al.

(10) Patent No.: US 10,205,187 B2
(45) Date of Patent: Feb. 12, 2019

(54) CONSTRAINED ANODE FIBER FOR RECHARGEABLE BATTERY

(71) Applicant: Intel Corporation, Santa Clara, CA (US)

(72) Inventors: Andrew Keates, Los Gatos, CA (US); Prabhat Tiwari, Gilbert, AZ (US)

(73) Assignee: Intel Corporation, Santa Clara ( * ) Notice: Subject to any disclaimer, the term of this patent is extended or adjusted under 35 U.S.C. 154(b) by 816 days.

(21) Appl. No.: 14/823,122

(22) Filed: Aug. 11, 2015

(65) Prior Publication Data

US 2016/0293993 A1 Oct. 6, 2016

Related U.S. Application Data

(60) Provisional application No. 62/142,814, filed on Apr. 3, 2015.

(51) Int. Cl.
*H01M 10/04* (2006.01)
*H01M 2/18* (2006.01)
(Continued)

(52) U.S. Cl.
CPC ......... *H01M 10/0431* (2013.01); *H01M 2/18* (2013.01); *H01M 4/134* (2013.01);
(Continued)

(58) Field of Classification Search
CPC ......... H01M 10/0431; H01M 10/0436; H01M 2004/022; H01M 2004/027;
(Continued)

(56) References Cited

U.S. PATENT DOCUMENTS

| 5,492,782 | A | | 2/1996 | Highley | |
|---|---|---|---|---|---|
| 5,916,514 | A | * | 6/1999 | Eshraghi | ............. H01M 8/2404 29/623.1 |
| 2009/0169996 | A1 | | 7/2009 | Aryna et al. | |
| 2010/0190061 | A1 | | 7/2010 | Green | |

(Continued)

FOREIGN PATENT DOCUMENTS

| WO | 2014021691 A1 | 6/2014 |
|---|---|---|
| WO | 2016-160247 A1 | 10/2016 |

OTHER PUBLICATIONS

Extended European Search Report received in European Patent Application No. 16773691.7, dated Aug. 1, 2018, 59 pages.
(Continued)

*Primary Examiner* — Lingwen R Zeng
(74) *Attorney, Agent, or Firm* — Grossman, Tucker, Perreault & Pfleger, PLLC (57) ABSTRACT

Generally, this disclosure provides systems, devices and methods for extending charge cycle life of rechargeable batteries through the use of constrained anode fibers. A battery may include a porous anode fiber configured to produce electrons during discharge of the battery. The battery may also include and an anode current collector layer, configured to provide a conductive path to a first terminal of the battery, wherein the anode current collector layer is concentrically disposed on the anode fiber to constrain expansion of the anode fiber during charging of the battery. The porosity of the anode fiber allows for the constrained expansion to be directed radially inward, decreasing the volume of the porous regions of the anode fiber.

16 Claims, 8 Drawing Sheets

(51) Int. Cl.
   *H01M 4/134*      (2010.01)
   *H01M 4/1395*     (2010.01)
   *H01M 4/38*       (2006.01)
   *H01M 4/76*       (2006.01)
   *H01M 10/052*     (2010.01)
   *H01M 4/02*       (2006.01)

(52) U.S. Cl.
   CPC ......... *H01M 4/1395* (2013.01); *H01M 4/386* (2013.01); *H01M 4/387* (2013.01); *H01M 4/765* (2013.01); *H01M 10/0436* (2013.01); *H01M 10/052* (2013.01); *H01M 2004/022* (2013.01); *H01M 2004/027* (2013.01); *H01M 2220/30* (2013.01)

(58) Field of Classification Search
   CPC .... H01M 2220/30; H01M 2/18; H01M 4/134; H01M 4/1395; H01M 4/386; H01M 4/387; H01M 4/765
   See application file for complete search history.

(56) References Cited

U.S. PATENT DOCUMENTS

| | | | |
|---|---|---|---|
| 2012/0009331 A1* | 1/2012 | Kwon | H01M 4/0404 427/58 |
| 2013/0189573 A1* | 7/2013 | Ichimura | H01M 4/58 429/199 |
| 2014/0186672 A1 | 7/2014 | Kwon et al. | |
| 2014/0212719 A1 | 7/2014 | Kwon et al. | |
| 2015/0064530 A1 | 3/2015 | Kwon et al. | |

OTHER PUBLICATIONS

Tae Hoon Hwang et al., "Electrospun Core-Shell Fibers for Robust Silicon Nanoparticle-Based Lithium Ion Battery Anodes", Nano Letters, vol. 12, No. 2, Feb. 8, 2012, 6 pages.
International Search Report and Written Opinion issued in PCT Application No. PCT/US2016/020391, dated Jul. 29, 2016, 8 pages.
International Preliminary Report on Patentability and Written Opinion issued in PCT Application No. PCT/US2016/020391, dated Oct. 3, 2017, 6 pages.

* cited by examiner

Drawing an anode material into a length of fiber, wherein the anode material is configured to produce electrons during discharge of a rechargeable battery.

710

Disposing an anode current collector layer concentrically on the fiber to constrain expansion of the fiber during charging of the battery, wherein the anode current collector layer is configured to provide a conductive path to a first terminal of the battery.

720

Disposing a separator layer concentrically on the anode current collector layer to provide electrical insulation between the anode current collector layer and a cathode of the battery and to allow flow of ions between the anode current collector layer and the cathode.

CONSTRAINED ANODE FIBER FOR RECHARGEABLE BATTERY

FIELD

The present disclosure relates to rechargeable batteries, and more particularly, to constrained anode fibers in rechargeable batteries to extend battery charge cycle life.

BACKGROUND

Rechargeable batteries with relatively high energy density are increasingly important components of electronic devices, particularly mobile devices such as smartphones and laptops. The number of charge/discharge cycles that these batteries can undergo before experiencing a significant loss of their energy storage capability is limited, however. This is due, at least in part, to expansion of the battery anode during charging, which may result in mechanical expansion and eventual fracturing of the anode materials over time. These rechargeable high energy density batteries are typically expensive to re-purchase. Additionally, for some devices the replacement process may be difficult, requiring technical expertise and specialized tools. For some devices, the replacement process may be cost prohibitive, essentially making replacement impossible. In most cases, users will be frustrated if their batteries degrade sooner than anticipated.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art.

DETAILED DESCRIPTION

Generally, this disclosure provides systems, devices and methods for extending the charge cycle life of rechargeable batteries through the use of constrained anode fibers. Such fibers may enable the construction of novel battery formats including conformal shapes as will be explained below.

The anode of a battery is typically configured to produce electrons during normal operation (discharge cycle) of the battery. During recharge, however, mechanical expansion of the anode caused by absorption of incoming ions may result in mechanical fractures of the anode material which, over time, may shorten the life of the battery. Batteries consistent with some embodiments of the present disclosure provide a porous anode fiber and an anode current collector layer that cylindrically encases the anode fiber. The anode current collector layer may be configured to constrain outward expansion of the anode fiber during charging of the battery. The porosity of the anode fiber allows for the constrained expansion to instead be directed radially inward, into the porous regions of the fiber. In some embodiments, the anode fiber may be configured with a hollow core, into which the expansion may be directed radially inward. The cylindrical shape of the encasing anode current collector layer may be the most effective structure to withstand the pressure exerted by the anode material expansion.

Figure 1:
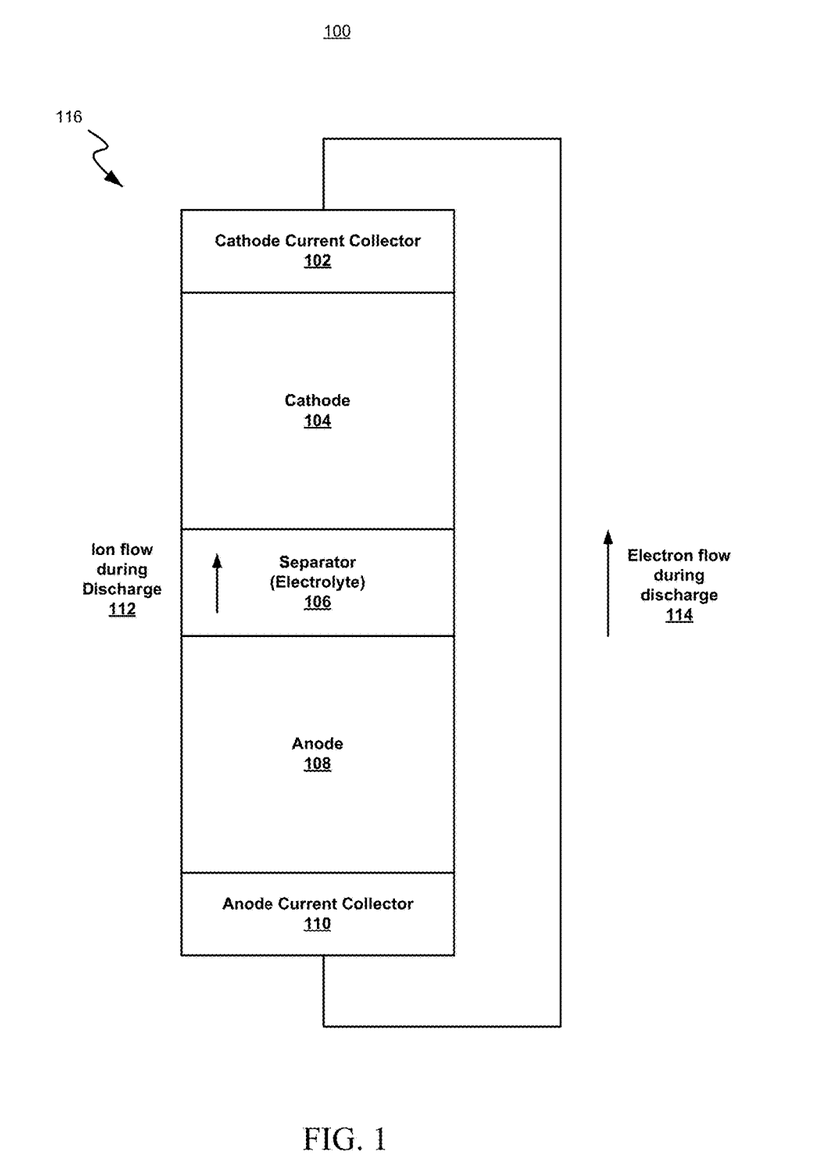
FIG. 1 illustrates a typical configuration of components in a battery.

FIG. 1 illustrates a typical configuration 100 of components in a battery 116, which may include a cathode current collector 102, a cathode 104, a separator (or separator/electrolyte) layer 106, an anode 108, and an anode current collector 110. A suitable enclosing container or case (not shown) may also generally be provided. The battery 116 may be any type of rechargeable battery including, for example, batteries that employ nickel cadmium, nickel metal hydride or lithium-ion chemistries.

The anode 108 generally comprises a material that can produce electrons, during battery discharge, through a chemical reaction process with the electrolyte 106 and the cathode 104. The anode current collector provides a relatively low resistance path for these electrons to flow out of the battery (e.g., through a copper terminal). The cathode 104 generally comprises a material that can receive electrons, for example, through the cathode current collector 102 (e.g., a second copper terminal of the battery). When a connection is made between the terminals of the battery 116, a flow of electrons 114, from the anode current collector 110 to the cathode current collector 102, discharges the battery. While the battery is discharging, positive ions 112 flow from the anode 108 through the separator layer or electrolyte 106 to the cathode 104, balancing the flow of electrons.

The separator layer 106 is configured to act as an electrical insulator between the cathode 104 and the anode 108. In some embodiments, the separator layer 106 may itself also act as an electrolyte, passing ions and blocking electrons. In such case, the separator layer may be solid. In other embodiments, the separator layer 106 may be porous, allowing a liquid or gel electrolyte to permeate the pores and provide the ion transport mechanism.

The anode current collector 110 may also serve as (or be connected to) one of the battery terminal connections, which is generally designated as the negative terminal because it is a source of electrons during discharge. The cathode current collector 102 may similarly serve as (or be connected to) a second one of the battery terminal connections, which is generally designated as the positive terminal.

The battery 116 may be recharged by reversing the electron flow 114 and ion flow 112, through the application of an appropriate voltage potential difference to the cathode current collector 102 and the anode current collector 110. During the charging or recharging cycle, many types of anode materials are subject to expansion. For example, in a lithium ion battery with a silicon anode, the silicon may expand in volume by 400 percent or more as it absorbs lithium ions. This expansion can cause fracturing of the anode material over time, causing premature degradation and shortening the useful life of the battery.

Figure 2A:
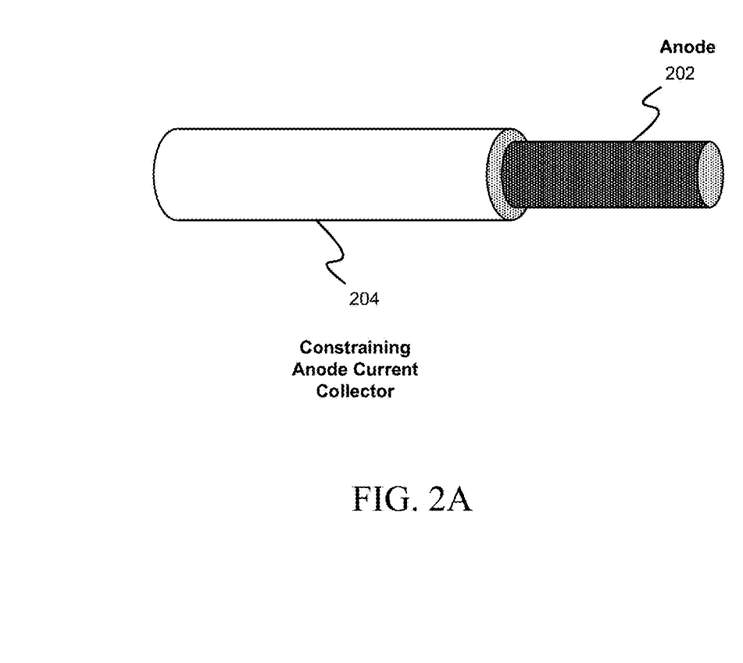
FIGS. 2A and 2B illustrate example embodiments of a constrained anode fiber consistent with the present disclosure.
Figure 2B:
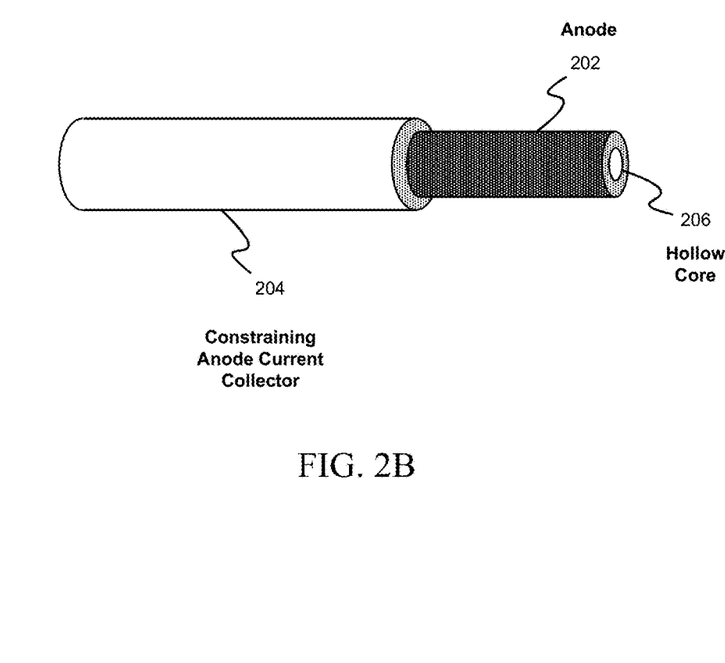

FIGS. 2A and 2B illustrate example embodiments of a constrained anode fiber consistent with the present disclosure. In both of these Figures, the anode material is shown drawn out into a fiber 202. A cylindrical, expansion-constraining anode current collector 204 is shown to concentrically encase the fiber of anode material 202. The constraining anode current collector 204 may be metallic to provide a relatively low resistance conduction path for the flow of electrons. In some embodiments, the constraining anode current collector 204 may be copper.

The anode material 202 shown in FIG. 2A is configured to be porous. When the material expands (e.g., during charging), the constraining anode current collector 204 forces the expansion to be directed radially inward into its own pores. In other words, the volume of the empty porous regions decreases as the material expands. Alternatively, the anode material 202 shown in FIG. 2B is configured to include a hollow core 206. When the material expands (e.g., during charging), the constraining anode current collector 204 forces the expansion to be directed radially inward into the hollow core. In other words, the volume of the hollow core region decreases as the material expands. The cylindrical shape of the constraining anode current collector 204 may be a relatively efficient geometrical structure to withstand the pressure exerted by the expanding anode material 202 and re-direct that expansion inward.

In some embodiments, the anode material 202 may be both porous and hollow cored. In some embodiments, the anode material 202 may be silicon, tin or any other suitable high-capacity material, where capacity is measured, for example, in hundreds or thousands of milliAmpere-Hours/gram. The constraining anode current collector 204 may also generally be configured to be porous, to permit the flow of ions between the anode 202 and the electrolyte.

Figure 3:
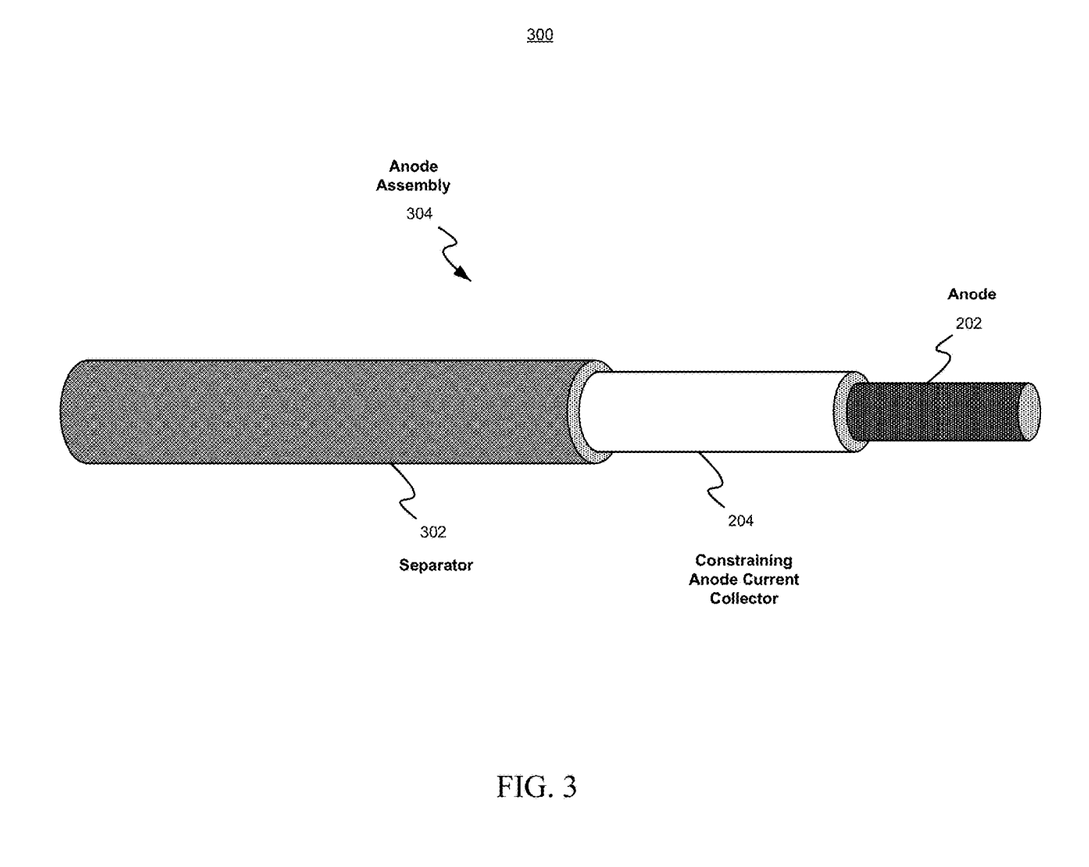
FIG. 3 illustrates an example embodiment of a constrained anode fiber and separator layer consistent with the present disclosure.

FIG. 3 illustrates an example embodiment 300 of a constrained anode fiber and separator layer consistent with the present disclosure. The separator layer 302, may comprise an electrolyte material to allow for the flow of electrolyte and ions between the anode (or anode current collector) and the cathode (or cathode current collector). The separator layer is shown to be concentrically disposed on the constraining anode current collector 204. In some embodiments, the separator layer 302 may be fabricated from ceramic materials or polymers to form a solid-state battery in which the separator also provides the electrolyte function of passing ions while blocking electrons. In other embodiments, the separator layer may be permeated with a wet electrolyte (e.g., liquid or gel). The resulting anode assembly 304 (comprising anode fiber 202, constraining anode current collector 204 and separator layer 302), may thus provide a building block for a rechargeable battery, as will be discussed in greater detail below.

Figure 4:
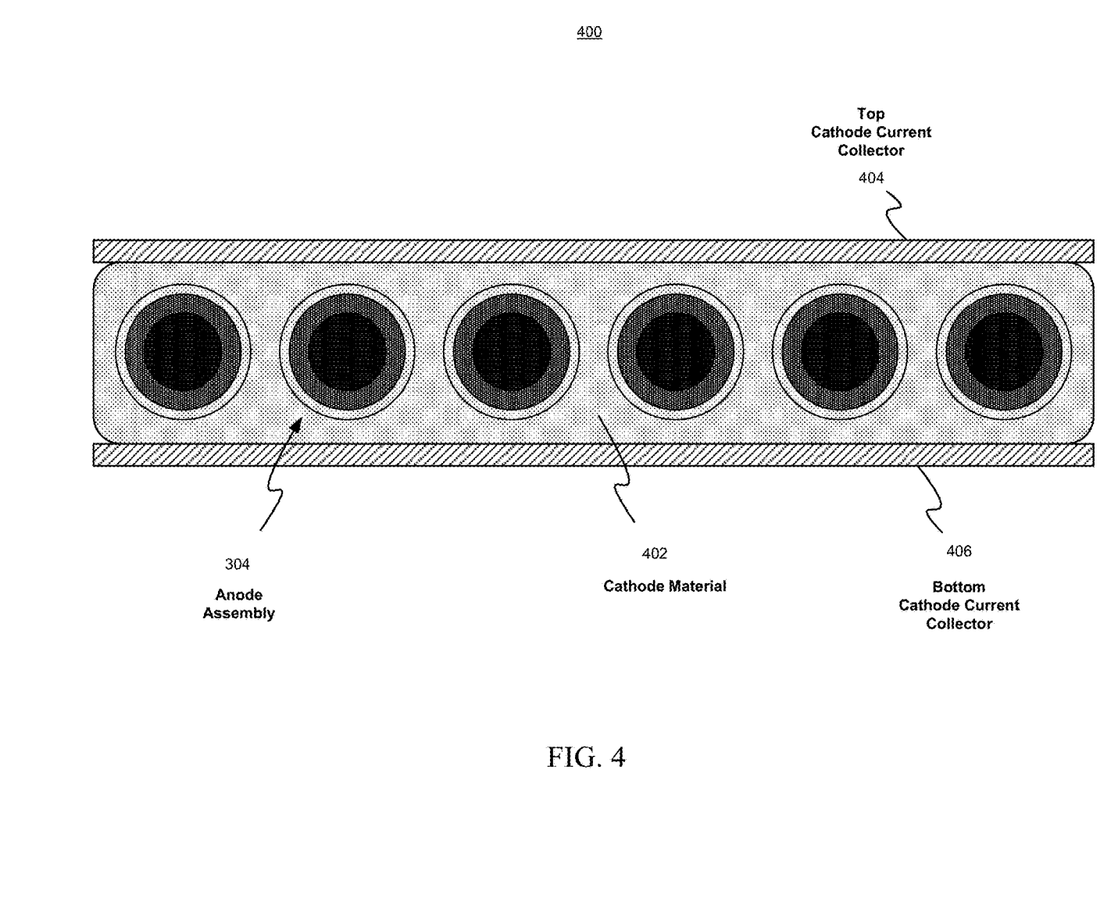
FIG. 4 illustrates a cross-sectional view of an example embodiment of a battery consistent with the present disclosure.

FIG. 4 illustrates a cross-sectional view 400 of an example embodiment of a battery or battery cell consistent with the present disclosure. The battery cell 400 is shown to include multiple anode assemblies 304 (each comprising anode fiber 202, constraining anode current collector 204 and separator layer 302) arranged in a two-dimensional planar configuration where each anode assembly runs substantially parallel to a neighboring anode assembly, although no particular alignment is required. The assemblies 304 are embedded in a cathode material 402, which in turn is encased between a top cathode current collector sheet 404 and a bottom cathode current collector sheet 406. The resulting planar or mat shaped battery cell may be malleable to mold or otherwise conform to a desired shape that suits the device, or application, requiring battery power. Of course, any number of battery cells 400 may be combined to form a larger battery to provide a sufficiently high level of Ampere-Hour capacity and to form any desired shape.

Figure 5:
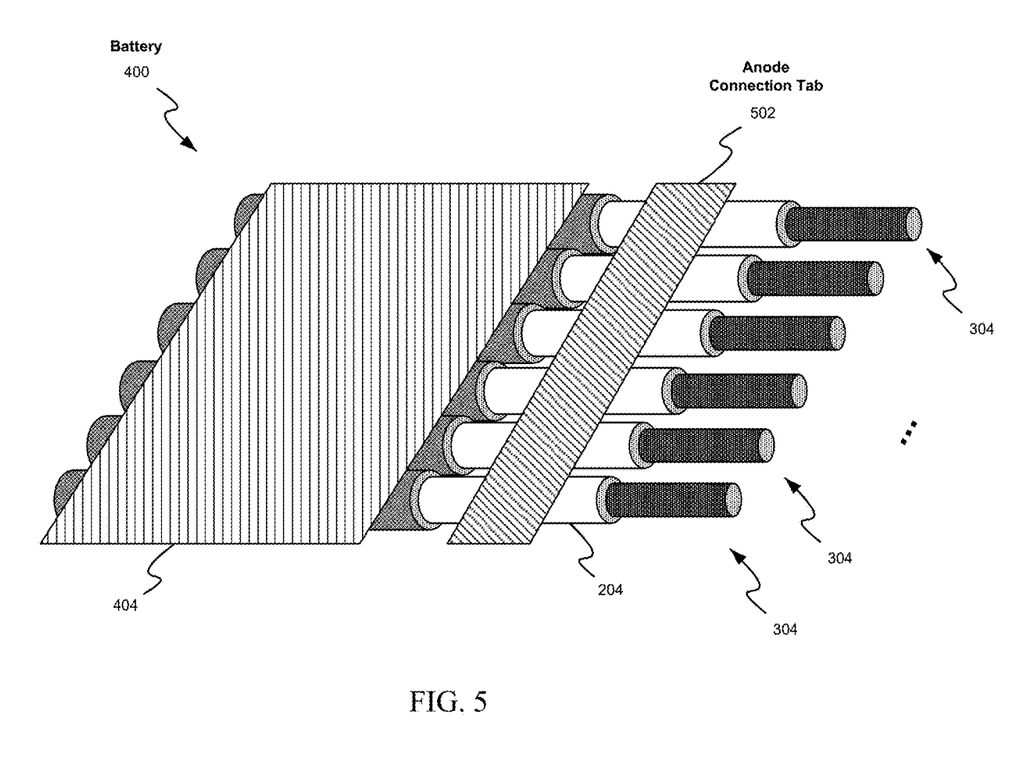
FIG. 5 illustrates an example embodiment of a battery assembly consistent with the present disclosure.

FIG. 5 illustrates an example embodiment 500 of a battery assembly consistent with the present disclosure. The battery 400 is shown in a perspective view from above. The top cathode current collector sheet 404 is shown, but the bottom sheet and the cathode material are not shown in this illustration, for simplicity. The constraining anode current collectors 204 of each anode assembly 304 may be electrically coupled to each other through anode connection tab 502, which may also serve as (or be connected to) one of the battery terminal connections (e.g., the negative terminal). In some embodiments, the anode connection tab 502 may be attached through laser welding, conductive adhesive or any other suitable means. The top and/or bottom cathode current collector sheets 404, 406 may similarly serve as (or be connected to) a second one of the battery terminal connections (e.g., the positive terminal).

Figure 6:
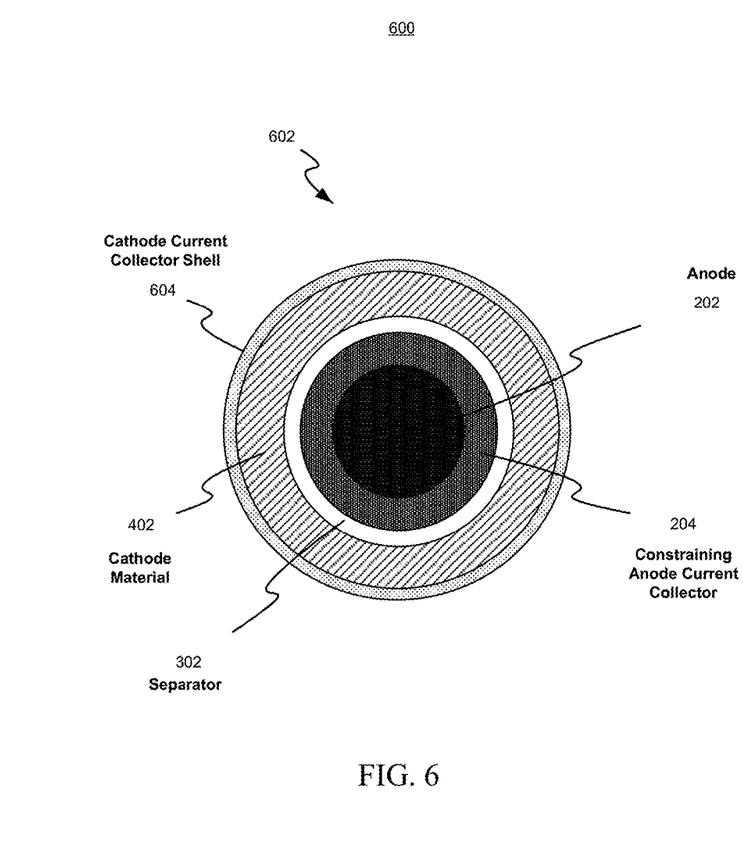
FIG. 6 illustrates a cross-sectional view of an example embodiment of a fiber assembly consistent with the present disclosure.

FIG. 6 illustrates a cross-sectional view 600 of another example embodiment of a battery cell fiber assembly consistent with the present disclosure. In this embodiment, a complete battery cell fiber assembly 602 is shown to include a core anode assembly 304 (comprising anode fiber 202, constraining anode current collector 204 and separator layer 302), encased in a cathode material layer 402 and a cathode current collector shell layer 604. The cathode material layer 402 and a cathode current collector shell layer 604 are concentrically disposed about the core anode assembly 304, for example as a conformal conductive coating. The resulting battery cell fiber assembly 602 may serve as a complete battery in the form of a fiber that can be incorporated as a structural element, for example in the plastic casing of a device. In some embodiments, multiple battery cell fiber assemblies 602 may be woven together as strands to form the complete battery. These woven strands may form a flexible fabric allowing the battery to conform to a desired shape that suits the device or application requiring power or to be incorporated in the structure of such a device.

The embodiments described herein may additionally provide an increased level of safety over conventional battery configuration since any internal shorts that may develop can be arrested by the resistance of the relatively thin current collector on the shorting strand.

Figure 7:
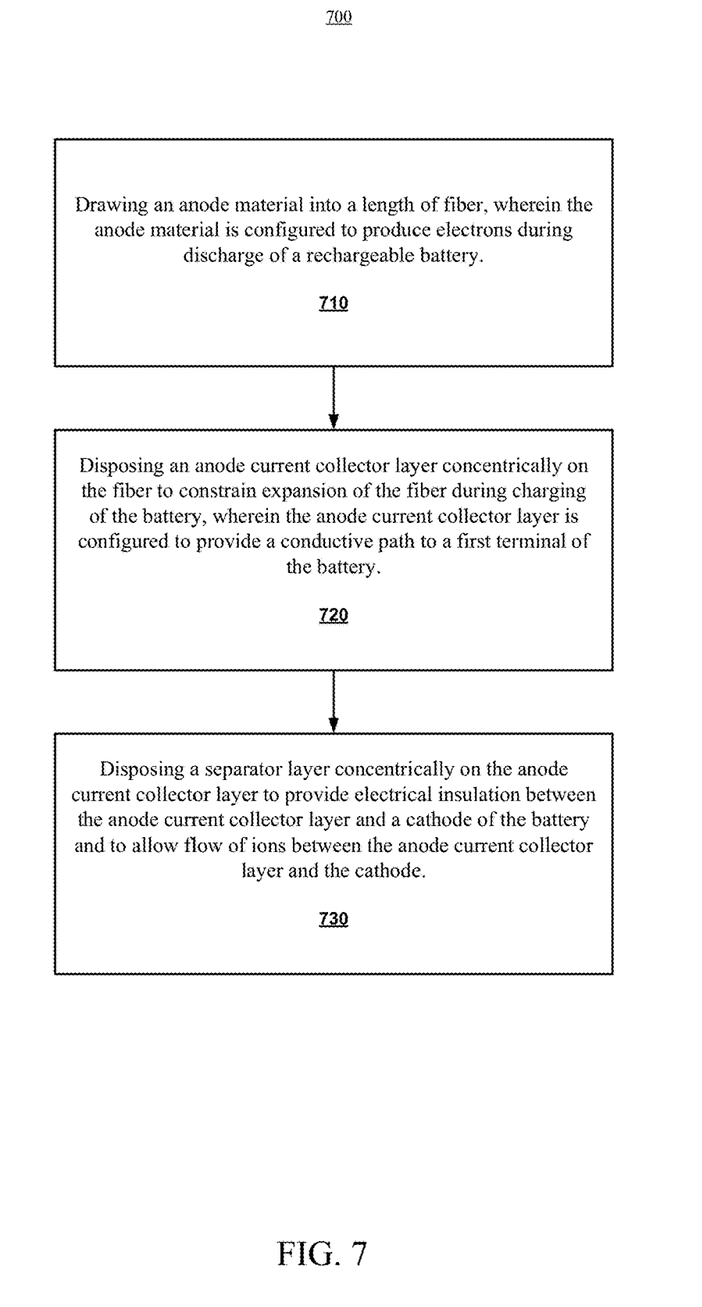
FIG. 7 illustrates a flowchart of operations of an example embodiment consistent with the present disclosure.

FIG. 7 illustrates a flowchart of operations 700 of another example embodiment consistent with the present disclosure. The operations provide a method for fabrication of a battery with extended charge cycle life. At operation 710, an anode material is drawn into a length of fiber. The anode material is configured to produce electrons during discharge of a rechargeable battery. The anode material may be silicon, tin or any other suitable material. In some embodiments, the fibers may be fabricated using a reel-to-reel production process that creates continuous fibers in a relatively low cost manner. At operation 720, an anode current collector layer is disposed concentrically on the fiber to constrain expansion of the fiber during charging of the battery. The anode current collector layer is configured to provide a conductive path to a first terminal of the battery. At operation 730, a separator layer is disposed concentrically on the anode current collector layer to provide electrical insulation between the anode current collector layer and a cathode of the battery and to allow flow of ions between the anode current collector layer and the cathode.

Figure 8:
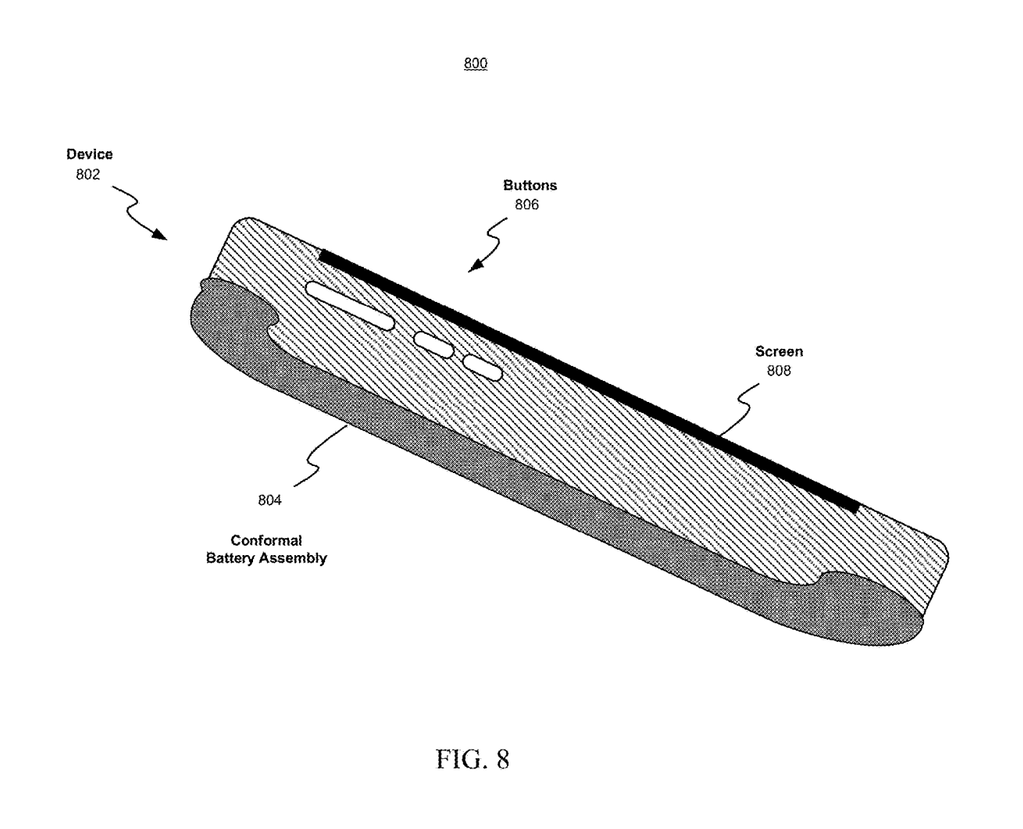
FIG. 8 illustrates an example embodiment of a conformal battery and device assembly consistent with the present disclosure.

FIG. 8 illustrates an example embodiment 800 of a device coupled to a conformal battery consistent with the present disclosure. Such an application may be facilitated by the use of a solid electrolyte, permitting the battery to be solid (i.e., absent of a liquid electrolyte). The device 802 may be a mobile platform or computing device such as, for example, a smart phone, smart tablet, personal digital assistant (PDA), mobile Internet device (MID), convertible tablet, notebook or laptop computer, or any other suitable device. It will be appreciated, however, that embodiments of the device described herein are not limited to mobile platforms, and in some embodiments, the device 802 may be a workstation or desktop computer. In addition to such computing and communication applications, other embodiments of a fiber based battery may be deployed in relatively more challenging applications, such as, for example, weaving battery fibers into clothing or embedding them into devices unsuitable for regular battery shapes, such as along the frames of spectacles.

The device may generally present various interfaces to a user via a screen or display element 808 such as, for example, a touch screen, liquid crystal display (LCD) or any other suitable display type. Various user interface controls or buttons 806 may also be employed by the device 802. A conformal battery assembly 804 may be configured to attach and provide power to device 802. The conformal battery assembly 804 may be configured to include anode fibers 202 and constraining anode current collectors 204 as previously described.

The device 802 may include any number of processors, memory, input/output circuitry, wired or wireless network interface circuitry, etc., which may require power from battery 804. In some embodiments, the processors may be implemented as any number of processor cores. The processor (or processor cores) may be any type of processor, such as, for example, a micro-processor, an embedded processor, a digital signal processor (DSP), a graphics processor (GPU), a network processor, a field programmable gate array or other device configured to execute code. The processors may be multithreaded processing cores. The memory may be coupled to the processors and may be any of a wide variety of memories as are known or otherwise available to those of skill in the art. It will be appreciated that the processors and memory may be configured to store, host and/or execute one or more user applications or other software. These applications may include, but not be limited to, for example, any type of computation, communication, data management, data storage and/or user interface task. In some embodiments, these applications may employ or interact with any other components of the device 802.

It will be appreciated that in some embodiments, the various components of the device 802 may be combined in a system-on-a-chip (SoC) architecture. In some embodiments, the components may be hardware components, firmware components, software components or any suitable combination of hardware, firmware or software.

The term "circuitry," as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., non-volatile) in memory devices. The circuitry may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Other embodiments may be implemented as software executed by a programmable control device. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Any of the operations described herein may be implemented in one or more storage devices having stored thereon, individually or in combination, instructions that when executed by one or more processors perform one or more operations. Also, it is intended that the operations described herein may be performed individually or in any sub-combination. Thus, not all of the operations (for example, of any of the flow charts) need to be performed, and the present disclosure expressly intends that all sub-combinations of such operations are enabled as would be understood by one of ordinary skill in the art. Also, it is intended that operations described herein may be distributed across a plurality of physical devices, such as processing structures at more than one different physical location. The storage devices may include any type of tangible device, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), magnetic or optical cards, or any type of media suitable for storing electronic instructions.

Thus, the present disclosure provides systems, devices and methods for extending charge cycle life of rechargeable batteries through the use of constrained anode fibers. The following examples pertain to further embodiments.

According to Example 1 there is provided a battery with extended charge cycle life. The battery may include a porous anode fiber to produce electrons during discharge of the battery; and an anode current collector layer to provide a conductive path to a first terminal of the battery, the anode current collector layer concentrically disposed on the anode fiber to constrain expansion of the anode fiber during charging of the battery.

Example 2 may include the subject matter of Example 1, and the constrained expansion of the anode fiber is directed radially inward, decreasing the volume of the porous regions of the anode fiber.

Example 3 may include the subject matter of Examples 1 and 2, and the porous anode fiber further includes a hollow core and the constrained expansion of the anode fiber is directed radially inward, decreasing the volume of the hollow core.

Example 4 may include the subject matter of Examples 1-3, further including a separator layer concentrically disposed on the anode current collector layer to provide electrical insulation between the anode current collector layer and a cathode of the battery and to allow flow of ions between the anode current collector layer and the cathode.

Example 5 may include the subject matter of Examples 1-4, further including a plurality of assemblies, each assembly including one of the anode fiber, the anode current collector layer and the separator layer; and the plurality of assemblies are arranged parallel to each other in a planar configuration and are embedded in a cathode material and the cathode material is encased in a top and bottom cathode current collector sheet.

Example 6 may include the subject matter of Examples 1-5, and the planar configuration of assemblies is molded into a shape that conforms to the form factor of a device to be powered by the battery.

Example 7 may include the subject matter of Examples 1-6, further including a cathode material layer concentrically disposed on the separator layer and a cathode current collector layer concentrically disposed on the cathode material layer.

Example 8 may include the subject matter of Examples 1-7, and the anode fiber includes silicon or tin.

According to Example 9 there is provided an anode for use in a battery. The anode may include porous anode material drawn into a length of fiber, the anode material to produce electrons during discharge of the battery; and an anode current collector layer to provide a conductive path to a first terminal of the battery, the anode current collector layer concentrically disposed on the fiber to constrain expansion of the fiber during charging of the battery.

Example 10 may include the subject matter of Example 9, and the constrained expansion of the fiber is directed radially inward, decreasing the volume of the porous regions of the anode material.

Example 11 may include the subject matter of Examples 9 and 10, and a separator layer is concentrically disposed on the anode current collector layer to provide electrical insulation between the anode current collector layer and a cathode of the battery and to allow flow of ions between the anode current collector layer and the cathode.

Example 12 may include the subject matter of Examples 9-11, and the anode material includes silicon or tin.

According to Example 13 there is provided an anode for use in a battery. The anode may include anode material drawn into a length of fiber, the fiber configured with a hollow core, the anode material to produce electrons during discharge of the battery; and an anode current collector layer to provide a conductive path to a first terminal of the battery, the anode current collector layer concentrically disposed on the fiber to constrain expansion of the fiber during charging of the battery.

Example 14 may include the subject matter of Example 13, and the constrained expansion of the fiber is directed radially inward, decreasing the volume of the hollow core.

Example 15 may include the subject matter of Examples 13 and 14, and a separator layer is concentrically disposed on the anode current collector layer to provide electrical insulation between the anode current collector layer and a cathode of the battery and to allow flow of ions between the anode current collector layer and the cathode.

Example 16 may include the subject matter of Examples 13-15, and the anode material includes silicon or tin.

According to Example 17 there is provided a method for fabrication of a battery. The method may include drawing an anode material into a length of fiber, and the anode material is to produce electrons during discharge of the battery; and disposing an anode current collector layer concentrically on the fiber to constrain expansion of the fiber during charging of the battery, and the anode current collector layer is to provide a conductive path to a first terminal of the battery.

Example 18 may include the subject matter of Example 17, and the anode material is porous and configured such that the constrained expansion of the fiber is directed radially inward, decreasing the volume of the porous regions of the anode material.

Example 19 may include the subject matter of Examples 17 and 18, and the fiber is configured with a hollow core and the constrained expansion of the fiber is directed radially inward, decreasing the volume of the hollow core.

Example 20 may include the subject matter of Examples 17-19, further including disposing a separator layer concentrically on the anode current collector layer to provide electrical insulation between the anode current collector layer and a cathode of the battery and to allow flow of ions between the anode current collector layer and the cathode.

Example 21 may include the subject matter of Examples 17-20, further including: arranging a plurality of assemblies of the fiber, the anode current collector layer and the separator layer, parallel to each other in a planar configuration; embedding the plurality of assemblies in a cathode material; and encasing the cathode material in a top and bottom cathode current collector sheet.

Example 22 may include the subject matter of Examples 17-21, further including molding the planar configuration of assemblies into a shape that conforms to the form factor of a device to be powered by the battery.

Example 23 may include the subject matter of Examples 17-22, further including disposing a cathode material layer concentrically on the separator layer and disposing a cathode current collector layer concentrically on the cathode material layer.

According to Example 24 there is provided a system for fabrication of a battery. The system may include means for drawing an anode material into a length of fiber, and the anode material is to produce electrons during discharge of the battery; and means for disposing an anode current collector layer concentrically on the fiber to constrain expansion of the fiber during charging of the battery, and the anode current collector layer is to provide a conductive path to a first terminal of the battery.

Example 25 may include the subject matter of Example 24, and the anode material is porous and configured such that the constrained expansion of the fiber is directed radially inward, decreasing the volume of the porous regions of the anode material.

Example 26 may include the subject matter of Examples 24 and 25, and the fiber is configured with a hollow core and the constrained expansion of the fiber is directed radially inward, decreasing the volume of the hollow core.

Example 27 may include the subject matter of Examples 24-26, further including means for disposing a separator layer concentrically on the anode current collector layer to provide electrical insulation between the anode current collector layer and a cathode of the battery and to allow flow of ions between the anode current collector layer and the cathode.

Example 28 may include the subject matter of Examples 24-27, further including: means for arranging a plurality of assemblies of the fiber, the anode current collector layer and the separator layer, parallel to each other in a planar configuration; means for embedding the plurality of assemblies in a cathode material; and means for encasing the cathode material in a top and bottom cathode current collector sheet.

Example 29 may include the subject matter of Examples 24-28, further including means for molding the planar configuration of assemblies into a shape that conforms to the form factor of a device to be powered by the battery.

Example 30 may include the subject matter of Examples 24-29, further including means for disposing a cathode material layer concentrically on the separator layer and disposing a cathode current collector layer concentrically on the cathode material layer.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A battery comprising:
   a porous anode fiber to produce electrons during discharge of said battery;
   an anode current collector layer to provide a conductive path to a first terminal of said battery, said anode current collector layer concentrically disposed on an outer surface of said anode fiber to constrain expansion of said anode fiber during charging of said battery; and
   a separator layer concentrically disposed on an outer surface of said anode current collector layer to provide electrical insulation between said anode current collector layer and a cathode of said battery.

2. The battery of claim 1, wherein said constrained expansion of said anode fiber is directed radially inward, decreasing the volume of said porous regions of said anode fiber.

3. The battery of claim 1, wherein said porous anode fiber further comprises a hollow core and said constrained expansion of said anode fiber is directed radially inward, decreasing the volume of said hollow core.

4. The battery of claim 1, wherein said separator layer is further to allow flow of ions between said anode current collector layer and said cathode.

5. The battery of claim 1, further comprising a plurality of assemblies, each assembly comprising one of said anode fiber, said anode current collector layer and said separator layer; wherein said plurality of assemblies are arranged parallel to each other in a planar configuration and are embedded in a cathode material and said cathode material is encased in a top and bottom cathode current collector sheet.

6. The battery of claim 5, wherein said planar configuration of assemblies is molded into a shape that conforms to the form factor of a device to be powered by said battery.

7. The battery of claim 1, further comprising a cathode material layer concentrically disposed on said separator layer and a cathode current collector layer concentrically disposed on said cathode material layer.

8. The battery of claim 1, wherein said anode fiber comprises silicon or tin.

9. An anode for use in a battery, said anode comprising:
   porous anode material drawn into a length of fiber, said anode material to produce electrons during discharge of said battery;
   an anode current collector layer to provide a conductive path to a first terminal of said battery, said anode current collector layer concentrically disposed on an outer surface of said fiber to constrain expansion of said fiber during charging of said battery; and
   a separator layer concentrically disposed on an outer surface of said anode current collector layer to provide electrical insulation between said anode current collector layer and a cathode of said battery.

10. The anode of claim 9, wherein said constrained expansion of said fiber is directed radially inward, decreasing the volume of said porous regions of said anode material.

11. The anode of claim 9, wherein said separator layer is further to allow flow of ions between said anode current collector layer and said cathode.

12. The anode of claim 9, wherein said anode material comprises silicon or tin.

13. An anode for use in a battery, said anode comprising:
   anode material drawn into a length of fiber, said fiber configured with a hollow core, said anode material to produce electrons during discharge of said battery;
   an anode current collector layer to provide a conductive path to a first terminal of said battery, said anode current collector layer concentrically disposed on an outer surface of said fiber to constrain expansion of said fiber during charging of said battery; and
   a separator layer concentrically disposed on an outer surface of said anode current collector layer to provide electrical insulation between said anode current collector layer and a cathode of said battery.

14. The anode of claim 13, wherein said constrained expansion of said fiber is directed radially inward, decreasing the volume of said hollow core.

15. The anode of claim 13, wherein said separator layer is further to allow flow of ions between said anode current collector layer and said cathode.

16. The anode of claim 13, wherein said anode material comprises silicon or tin.

* * * * *